Oct. 26, 1954   W. H. TANKE ET AL   2,692,543
LISTER PLOW
Filed July 19, 1950   2 Sheets-Sheet 1

Inventors
Willard H. Tanke
Joseph P. Sexton Jr.
by Louis V. Schiavo
Attorney

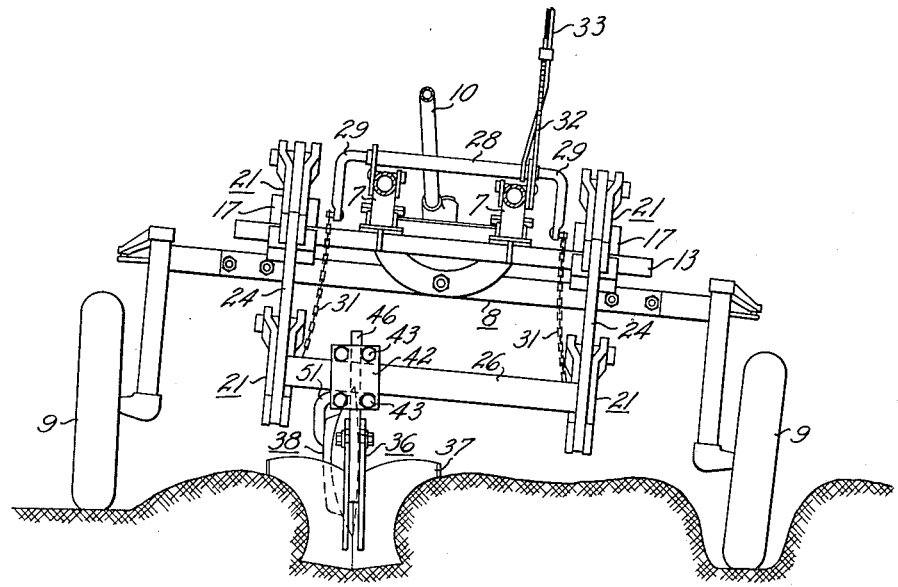
Fig. 3
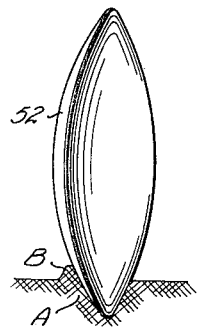
Fig. 5
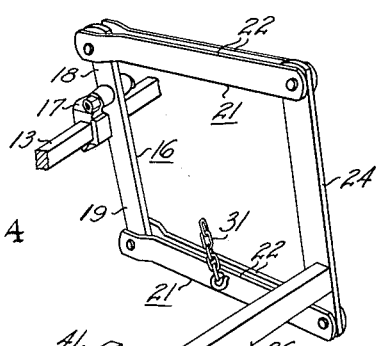
Fig. 4
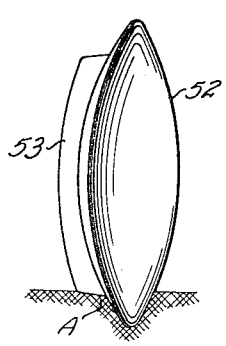
Fig. 6
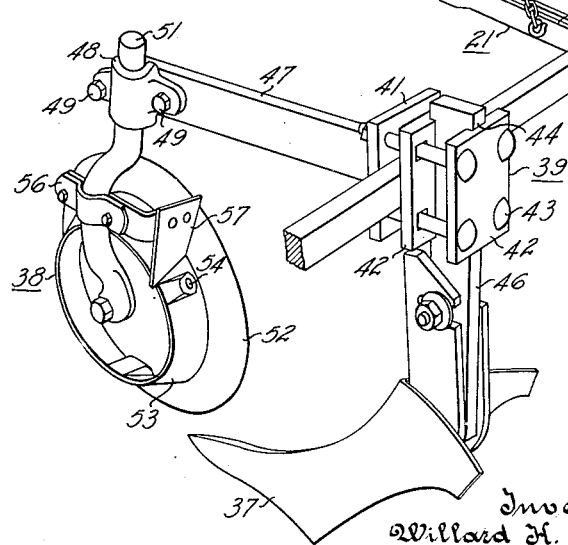

Patented Oct. 26, 1954

2,692,543

UNITED STATES PATENT OFFICE 2,692,543

LISTER PLOW

Willard H. Tanke, La Crosse, Wis., and Joseph P. Sexton, Jr., Clewiston, Fla., assignors to Allis-Chalmers Manufacturing Company, Milwaukee, Wis.

Application July 19, 1950, Serial No. 174,598

3 Claims. (Cl. 97—47.38)

This invention relates generally to agricultural ground working implements and is more particularly concerned with the improvement of implements of the type including a bilateral soil turning element mounted on a mobile frame structure having any suitable form of front and rear ground engaging supports (hereinafter called wheels) affording steerability and travel in a straight line in the direction of the longitudinal axis of the mobile frame.

In using such implements for the preparation of seed beds it is desirable to run the wheels on one side of the mobile frame structure (hereinafter called tractor) in the previously made furrow in order to avoid the formation of ruts in the top surfaces of the beds. However, most tractors suitable for operatively mounting only a single bilateral soil turning element, such as a lister or bedder bottom, rarely afford a lateral spacing of the supporting wheels in excess of 64 inches. Consequently when such a tractor implement combination is to form rows of seed beds on centers in excess of 32 inches, it is necessary to offset the bilateral soil turning element (hereinafter called lister) with respect to the central longitudinal axis of the tractor. This offsetting of the lister makes steering difficult as the tractor tends to turn from the desired line of travel.

Various means have been devised for overcoming this tendency, but generally the result has been a complicated structure with corresponding increase in the cost of manufacture and a failure to function in an entirely satisfactory manner. In this connection, one such means consists of mounting a dished rolling colter or disk in front of the lister with its concave side facing forwardly in a direction tending to negative the side draft effect resulting from the offset mounting of the lister. Seed beds are commonly formed in soil which has been quite thoroughly worked and consequently is fairly loose. This necessitates setting the disk to run at a considerable angle and depth in order to nullify side draft produced by the offset lister, which in turn results in considerable soil being transferred from one side of the lister point to the other, thus making the top surface of the beds too uneven for practical purposes. And the same thing is true to a material extent when the beds are formed in soil which has not already been worked.

Applicants have discovered that this difficulty can be satisfactorily remedied by mounting an additional soil engaging element in front of an offset lister providing this additional element presents a forwardly inclined soil penetrating surface which affords a downward soil compacting action of a character effective to nullify side draft without appreciable soil movement of a nature materially adversely affecting the formation of uniform seed beds.

Accordingly, it is an object of this invention to provide an improved tractor implement combination comprising a lister and an additional soil engaging element disposed in front of the lister and presenting a surface portion shaped and arranged to afford a soil penetrating and compacting action of a character effective to nullify side draft without appreciable soil movement of a nature materially adversely affecting the formation of uniform seed beds.

Another object of this invention is to provide an improved tractor implement combination comprising a lister and an additional soil engaging element wherein the lister may be mounted on the tractor in offset relation to the central longitudinal axis thereof, the additional soil engaging element being disposed in front of the lister and presenting a surface portion shaped and arranged to afford a soil penetrating and compacting action of a character effective to nullify side draft due to the aforesaid offset position of the lister without appreciable soil movement of a nature materially adversely affecting the formation of uniform seed beds.

And still another object of this invention is to provide an improved tractor implement combination comprising a transversely adjustable laterally swingable unitary structure including a lister and a combined gauge wheel and additional soil engaging element disposed in front of the lister and presenting a surface portion shaped and arranged to afford a soil penetrating and compacting action of a character effective to nullify side draft without appreciable soil movement of a nature materially adversely affecting the formation of uniform seed beds.

And accordingly this invention may be considered as comprising the various features of construction and/or combination affording one or more of the above stated and other objects and advantages as hereinafter more particularly pointed out in the following detailed description and appended claims, reference being had to the accompanying drawing of an illustrative apparatus, in which:

Fig. 3 is a section taken on line III—III, Fig. 2, showing the tractor tilted and the tool unit offset relative to the central longitudinal axis of the tractor and in upright position relative to the ground;

Fig. 4 is a perspective view of the tool unit and tool frame, part of the latter being omitted for the sake of clarity;

Fig. 5 is a schematic view of the additional soil engaging element alone looking from the rear and shows its effect on the soil as it advances; and Fig. 6 is a schematic view of the additional soil engaging element and the associated gauge means looking from the rear and shows their effect on the soil as they advance together.

Figures 1, 2:
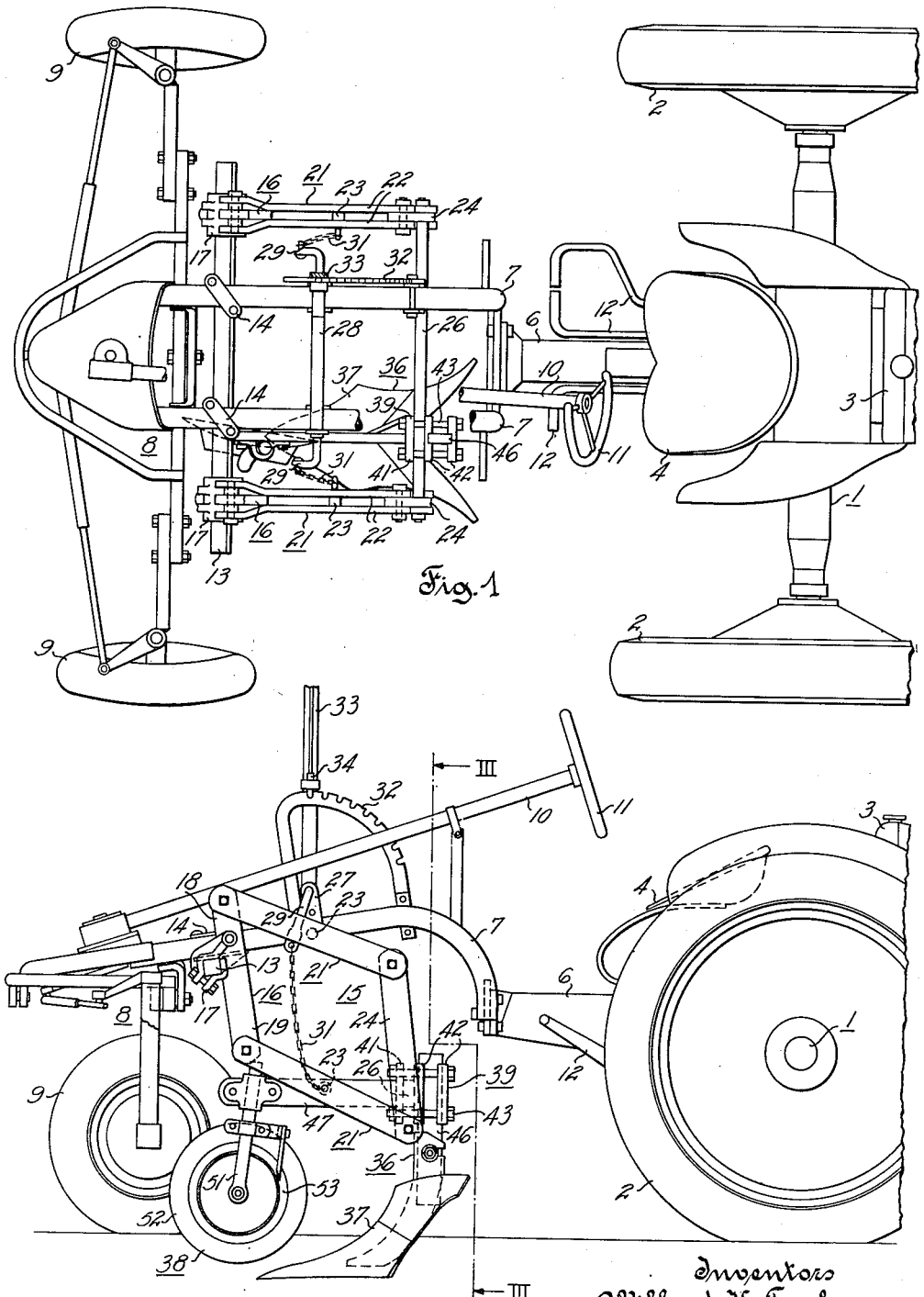
Fig. 1 is a plan view of a tractor implement combination with parts broken away to better show the invention.
Fig. 2 is a side elevation of the tractor implement combination shown in Fig. 1, the front dirigible wheel on the near side of the tractor being omitted to better show the invention.

Referring particularly to Figs. 1 and 2, it will be seen that the mobile frame or tractor element of the combination includes a rear axle structure 1 mounting a pair of laterally spaced ground engaging traction wheels 2 at opposite ends thereof and mounting a centrally disposed rearwardly extending power unit (of which only the radiator 3 is shown) drivingly connected in a conventional manner with the axle elements mounting the traction wheels. An operator's seat or station 4 is mounted on a tubular frame part 6 extending forwardly from a central portion of axle structure 1 and in forward adjacent relation to radiator 3. A pair of laterally spaced tubular frame members 7 have rear end portions thereof rigidly united in a suitable manner with part 6, these tubular members arching upward abruptly and then forward and downward to a supporting front axle structure 8, which in turn is supported on a pair of laterally spaced ground engaging dirigible wheels 9 mounted at opposite ends of the axle structure. The steering mechanism includes a rearwardly extending shaft 10 and a steering wheel 11, which is disposed within easy reach of an operator sitting at station 4, and it is to be understood that the tractor is also provided with the usual operator actuated controls, of which only foot pedals 12 are shown.

A rigid cross bar 13 is secured to the underside of opposed forward portions of tubular frame members 7 by means of suitable clamps 14 and is disposed thereby transversely relative to the direction of travel and immediately to the rear of front axle structure 8. Bar 13 is generally parallel to the transverse front axle structure and preferably projects equal distances to either side of frame members 7 for mounting a tool frame 15. Tool frame 15 comprises a pair of similar flat bar stock hangers 16 mounting clamps 17 of conventional design intermediate their ends. One such hanger is rigidly detachably secured by means of the associated clamp 17 to each end portion of bar 13, presenting upwardly extending arm 18 and depending arm 19. These arms pivotally mount, respectively, similar upper and lower vertically spaced links 21, each link comprising a pair of flat bar stock members 22 secured together in laterally spaced relation by a spacer member 23, and each arm being disposed between the forward end portions of the associated pair of members 22. The rear end portions of upper and lower vertically spaced links 21 are pivotally connected with opposite end portions of a pair of similar flat bar stock links 24, each of which is disposed in a common vertical longitudinal plane with the associated hanger 16 and between the rear end portions of the associated pairs of members 22. A tool bar or draft transmitting member 26 of flat bar stock is terminally rigidly secured, as by welding, to transversely aligned portions of links 24 and is disposed thereby transversely relative to the central longitudinal axis of the tractor, in underslung relation to the tractor and between the front and rear wheels thereof. It is to be understood that the linkage on one side of the tractor comprising upper and lower links 21 and member 24 is in transverse alignment with the corresponding linkage on the other side of the tractor, and that due to the rigid connection between these link structures afforded by tool bar 26 they move vertically together. And it is also to be understood that when tool frame 15 is secured to bar 13 by means of hangers 16 and clamps 17 it may be considered as a portion of the tractor frame.

A pair of upstanding brackets 27 are secured to opposed portions of frame members 7 in any suitable manner, and a rock shaft 28 is rotatably mounted in the brackets and disposed thereby on the top side of these frame members in generally parallel relation to the front axle structure 8 and bar 13. The opposite end portions of shaft 28 are bent at a right angle to its longitudinal axis so as to form crank or lift arms 29. Each lift arm is positioned in forward and downward extending relation with respect to the longitudinal axis of shaft 28 and generally alongside the inner or tractor side of the adjacent one of upper links 21. The free end of each lift arm is connected by means of a chain 31 to an intermediate portion of the adjacent one of lower links 21. A notched quadrant 32 and a lever 33 mounting a quadrant engaging latch 34 are operatively associated with shaft 28 for actuating and maintaining it in any selected position to thereby adjust the vertical position of tool bar 26 relative to frame members 7. Preferably the free end of lever 33 (not shown) is positionable to extend rearward to a point within easy reach of an operator seated at station 4.

A soil working implement attachment or tool unit 36 is mounted on tool bar 26 by means of a clamp 39, this attachment 36 comprising a bilateral soil turning implement in the form of a lister or bedder 37 and a combination depth gauging means and additional soil engaging element 38. Clamp 39 comprises a plate 41, a pair of similar castings 42 and a set of four bolts 43. Plate 41 is disposed in forward side abutting relation to a portion of tool bar 26. One casting 42 is disposed in rearward side abutting relation to the same portion of tool bar 26, and the other casting 42 is disposed in rearward spaced relation to the first mentioned casting. Aligned openings in each clamp part 41 and 42 receive bolts 43, a pair of these bolts being positioned in laterally spaced relation to one another above tool bar 26, and the other pair being positioned in laterally spaced relation to one another below tool bar 26, the clear vertical spacing between the pairs of bolts being greater than the depth of tool bar 26. The opposed surfaces of castings 42 have vertical grooves 44 formed therein between the laterally spaced bolts 43 for the reception of a portion of a flat bar stock beam 46, the opposed edges of the mentioned portion being disposed in grooves 44 and the remainder of beam 46 being disposed in depending relation to clamp 39 for carrying lister 37 in a conventional manner.

A flat bar stock arm 47 is braced and rigidly secured, as by welding, to plate 41 and is positioned thereby to extend forward therefrom for supporting depth gauging and additional soil engaging element 38. A clamp 48 is secured in side abutting relation to a forward portion of arm 47 by means of a pair of bolts 49 received in aligned openings in the clamp and arm. The body of clamp 48 is shaped to form with arm 47 a vertically disposed opening for the reception of a portion of a round bar stock shank 51, the remainder of shank 51 being disposed in depending relation to clamp 48. Depth gauging means and additional soil engaging element 38 comprises a colter blade or disk 52 and depth gauge means or rim 53. Disk 52 is concavo-convex in form and is carried by the lower extremity of shank 51, being mounted thereon in any conventional manner for rotation about a horizontal axis with the convex surface thereof facing shank 51 and disposed in spaced relation thereto. Gauge means 53 is a continuous sheet metal band having a periphery in the form of a conical frustum, being rigidly secured, as by rivets 54, to disk 52 with the base thereof next to the convex surface and for rotation therewith on a common central longitudinal axis. An intermediate portion of shank 51 is offset to clear gauge means 53 and to permit disk 52 to be positioned over the point of lister 37. A scraper support bracket 56 is rigidly adjustably secured in any suitable manner to the offset portion of shank 51 and extends rearward therefrom to mount a scraper blade 57 depending therefrom and formed to engage the outer surface of gauge means 53 and the marginal area of the convex surface of disk 52 to prevent the accumulation of soil thereon.

During normal operation the wheels on the right side of the tractor, as viewed by an operator seated at his station on the tractor, travel in the previously made furrow, and the wheels on the left side of the tractor travel on unlisted land. Consequently, the tractor as a whole, including the tool frame 15, is tilted to one side. However, by loosening bolts 43 soil working implement attachment 36 may be laterally swung or angularly adjusted relative to tool bar 26 so that it will travel in upright position relative to the ground (see Fig. 3), there being sufficient clearance between the upper and lower bolts 43 to permit this adjustment. Also, by loosening bolts 43, beam 46 and lister 37 may be adjusted vertically relative to clamp 39. By loosening bolts 49 shank 51 and depth gauging means and additional soil engaging element 38 may be adjusted vertically relative to lister 37 and angularly about the longitudinal axis of the shank. Disk 52 is positioned in front of lister 37 and generally over the point thereof with the convex surface of disk 52 facing forward and to the left. Gauge means 53 travels over unlisted ground and supports the weight of soil working implement attachment 36, the vertical distance between gauge means 53 and the point of lister 37 determining the working depth of the lister. Lever 33 may be left free to float on quadrant 32 or locked in the extreme forward position. In the latter case, care must be exercised to provide slack in chains 31 to afford soil working implement attachment 36 freedom to move vertically relative to the tractor frame to accommodate irregularities in the ground traversed and to assure a uniform working depth. When soil working implement attachment 36 is to be transported lever 33 is pulled to the rear. Initial movement thereof takes up the slack in chains 31, and further movement causes implement attachment 36 to move upward to the desired transport height.

When the maximum wheel tread of the tractor is 64 inches and the beds being formed are on centers exceeding 32 inches it becomes necessary to offset implement attachment 36 relative to the central longitudinal axis of the tractor. For example, for beds 40 inches on centers, bolts 43 are loosened and implement attachment 36 is moved along tool bar 26 and positioned so that the laterally measured distance between the right front wheel 9 and the center of lister 37 is 40 inches. This places implement attachment 36 on the left side of the tractor so that a virtual center of ground resistance is afforded at one side of the tractor. As the tractor advances, a side draft effect or tendency to turn from a straight line of travel and toward the left is developed, causing difficult steering. Disk 52 is angled relative to the direction of travel so that the leading edge thereof is to the right of the trailing edge, and as the disk advances the lower forward edge portion thereof cuts through the soil. It should be apparent that the marginal area of the convex surface of the disk adjacent the mentioned edge portion comprises a forwardly inclined soil penetrating surface portion which acts downward and compacts the soil engaged thereby, the angled position of the disk relative to the direction of travel being effective to simultaneously afford movement of the soil to the left. And in this connection, the showing and description of a member having a forwardly facing convex surface is merely for the purpose of illustration, and it is not intended to limit applicants' invention thereto as other suitable forms for the member may occur to those skilled in the art. Referring to Fig. 5, the pressure on the soil afforded by the disk as it advances compacts the disturbed soil into the area designated by the character A and causes a tendency for the ground line to rise as at B. However, gauge means 53, coacting with disk 52 and supporting the weight of the soil working implement attachment 36, acts downward to prevent the ground line from rising and to compact the disturbed soil into the area designated by A (see Fig. 6), the reactive force on the implement due to the mentioned compacting action being of a character effective to nullify any side draft effect. Furthermore, it should be apparent that since the additional soil engaging element moves some soil from one side of the lister point to the other, the furrow made by the additional soil engaging element should be as shallow as possible in order to avoid interfering with the formation of uniform seed beds by the lister. Applicants' apparatus definitely requires the formation of a comparatively shallow furrow in order to develop sufficient force to stabilize the tractor and thus contributes materially to the formation of uniform seed beds.

It should now be apparent that a unitary gauge wheel and soil working disk has been combined for coaction with a lister and a tractor in a manner affording lateral stability of the tractor and contributing materially to the formation of uniform seed beds by requiring the gauge wheel disk to form only a comparatively shallow furrow. And it should be apparent that the gauge wheel disk and the lister are vertically adjustable relative to one another for determining the working depth of the lister, and that the gauge wheel disk may be selectively angled relative to the longitudinal axis of the tractor to afford any desired lateral stabilizing force. Also, it should be apparent that the gauge wheel disk and the lister may be moved as a unit vertically from working to transport position, and vice versa, transversely relative to the longitudinal axis of the tractor to make seed beds on various centers, and angularly relative to the tractor frame to compensate for the tilt thereof when the wheels on one side of the tractor only travel in a furrow.

It should be obvious that although the apparatus herein disclosed as embodying the invention has particular utility in the mounting of a tillage implement on a mobile support, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. A propelled agricultural implement combination comprising a tractor having a pair of laterally spaced traction wheels, an implement operatively carried by said tractor and comprising a soil turning element shaped to move soil bilaterally uniformly from a furrow formed by advancement of said element, said soil turning element being positioned in a laterally offset relation to said tractor and to other portions of said implement so as to produce a net unbalanced side draft effect impairing steerability, and a soil penetrating blade mounted forwardly of said soil turning element and angularly disposed in oblique side draft nullifying relation to the direction of travel, said blade having a soil penetrating edge and a forward side which overhangs the soil engaged portion of said edge in compacting relation to soil which is pushed forward and upward immediately in advance of said soil penetrating portion of said edge by the travel of said implement combination.

2. A propelled agricultural implement combination comprising a tractor having a pair of laterally spaced traction wheels, an implement operatively carried by said tractor and comprising a soil turning element shaped to move soil bilaterally uniformly from a furrow formed by advancement of said element, said soil turning element being positioned in a laterally offset relation to said tractor and to other portions of said implement so as to produce a net unbalanced side draft effect impairing steerability, and a rolling colter blade mounted forwardly of said soil turning element and angularly disposed in oblique side draft nullifying relation to the direction of travel, said colter blade having a soil penetrating edge and a convex forward side which overhangs the soil engaged portion of said edge in compacting relation to soil which is pushed forward and upward in advance of said soil penetrating portion of said edge by the travel of said implement combination.

3. A propelled agricultural implement combination comprising a tractor having a pair of laterally spaced traction wheels, an implement operatively carried by said tractor and comprising a soil turning element designed to move soil bilaterally uniformly from a furrow formed by advancement of said element, said soil turning element being positioned in a laterally offset relation to said tractor and to other portions of said implement so as to produce a net unbalance side draft effect impairing steerability, and a rolling colter blade mounted forwardly of said soil turning element and angularly disposed in oblique side draft nullifying relation to the direction of travel, said colter blade having a soil penetrating edge and a continuous circumferential gauge projection on its forward side which is disposed in compacting relation to soil which is pushed forward and upward immediately in advance of said soil penetrating portion of said edge by the travel of said implement combination.

References Cited in the file of this patent

UNITED STATES PATENTS

| Number | Name | Date |
| --- | --- | --- |
| 132,842 | Lane | Nov. 5, 1872 |
| 851,902 | Smith | Apr. 30, 1907 |
| 922,405 | Dreyer | May 18, 1909 |
| 944,478 | Brown | Dec. 28, 1909 |
| 961,113 | Ewing | June 14, 1910 |
| 1,149,992 | Brennan | Aug. 10, 1915 |
| 1,733,914 | Shiller | Oct. 29, 1929 |
| 1,901,539 | Tapp | Mar. 4, 1933 |
| 2,172,971 | Graham | Sept. 12, 1939 |
| 2,244,774 | Hewitt | June 10, 1941 |
| 2,274,438 | Stoner | Feb. 24, 1942 |
| 2,351,078 | Silver | June 13, 1944 |